United States Patent
Wang et al.

(10) Patent No.: US 12,059,001 B2
(45) Date of Patent: Aug. 13, 2024

(54) SPROUT INHIBITOR CONTAINING DIHYDROCARVYL ACETATE AND USE THEREOF

(71) Applicants: Tobacco Research Institute of Chinese Academy of Agricultural Sciences, Qingdao (CN); Shandong Agricultural University, Tai'an (CN)

(72) Inventors: Xiuguo Wang, Qingdao (CN); Peiqiang Li, Qingdao (CN)

(73) Assignees: Tobacco Research Institute of Chinese Academy of Agricultural Sciences, Qingdao (CN); Shandong Agricultural University, Tai'an (CN)

( * ) Notice: Subject to any disclaimer, the term of this patent is extended or adjusted under 35 U.S.C. 154(b) by 46 days.

(21) Appl. No.: 17/818,366

(22) Filed: Aug. 9, 2022

(65) Prior Publication Data
US 2023/0107875 A1   Apr. 6, 2023

(30) Foreign Application Priority Data
Sep. 26, 2021  (CN) .......................... 202111127385.4

(51) Int. Cl.
*A01N 37/02*    (2006.01)
*A01N 25/04*    (2006.01)
*A01P 21/00*    (2006.01)

(52) U.S. Cl.
CPC ............. *A01N 37/02* (2013.01); *A01N 25/04* (2013.01); *A01P 21/00* (2021.08)

(58) Field of Classification Search
CPC ......... A01N 37/02; A01N 25/04; A01P 21/00; Y02A 50/30; A01G 7/06; A23B 7/154
See application file for complete search history.

(56) References Cited

U.S. PATENT DOCUMENTS

2013/0225676 A1\*   8/2013   Coppens ................. A61P 31/20
                                                   514/475

OTHER PUBLICATIONS

The Dow Technical Data Sheet NP-10 is nonylphenyl ethoxylate (10) (Year: 2024).\*

\* cited by examiner

*Primary Examiner* — Anna R Falkowitz
(74) *Attorney, Agent, or Firm* — Chiesa Shahinian & Giantomasi PC

(57) ABSTRACT

The present disclosure relates to a sprout inhibitor composition containing dihydrocarvyl acetate and use thereof. The sprout inhibitor composition contains the active ingredient dihydrocarvyl acetate or isomers thereof. In sprout inhibition tests for the sprout inhibitor in tobacco and potato, when the dosage of the active ingredient is equivalent to carvone, the sprout inhibitor exhibits a significantly better sprout inhibition effect than that of carvone. The sprout inhibitor provided by the present disclosure is effective on tobacco and potato plants in low dosage with long effective duration. Moreover, no phytotoxicity of the sprout inhibitor on the tobacco or the potato is found within the application range.

8 Claims, No Drawings

SPROUT INHIBITOR CONTAINING DIHYDROCARVYL ACETATE AND USE THEREOF

CROSS REFERENCE TO RELATED APPLICATION

This application claims priority from Chinese Patent Application No. 202111127385.4, filed Sep. 26, 2021, the disclosure of which is incorporated herein by reference in its entirety as part of the present application.

FIELD

The present disclosure relates to a sprout inhibitor with dihydrocarvyl acetate or isomers thereof as an active ingredient, and a method for inhibiting sprout of tobacco or potato using the sprout inhibitor containing the dihydrocarvyl acetate or isomers thereof.

BACKGROUND

Sprout inhibition for preservation, as an important technical means for economic crops such as tobacco, potato, sweet potato, garlic, onion, ginger, etc., plays an important role in maintaining yield, quality, and guaranteeing storage quality. After squaring and flowering of tobacco plants, nutrients in the terminal inflorescence are consumed, leading to insufficient nutrient acquisition in middle and lower tobacco leaves. Therefore, topping tobacco plants is a necessary means in production. After the tobacco plant is topped off, sprout inhibitor should be applied. If not, 2-3 axillary buds will grow at each leaf axil and the growth of the buds consume a large amount of nutrients effecting yield and quality of tobacco leaves. Therefore, the tobacco plant should be topped off in a timely manner, and a sprout inhibitor should be applied to inhibit the growth of the axillary buds after topping.

After harvest, tubers of potato, sweet potato, garlic, onion and ginger sprout after 2-3 months of dormancy. Quality deterioration, decay, and quality loss due to sprouting are the biggest problems during storage; losses caused by sprouting account for 20%-25% of the total yield yearly. In addition, sprouting potatoes produce toxic substances such as solanine, and bring huge safety hazards to consumers. Therefore, artificial control of the sprouting of tubers of potatoes and sweet potatoes during storage is a crucial problem in the crop storage and processing industry.

At present, sprout inhibition is achieved by using chemical agents, which can effectively lower the sprouting rate and further reduce economic losses thereby. The chemical sprout inhibitors commonly used include pendimethalin, butralin, flumetralin, and chlorpropham. In spite of the low costs, the common sprout inhibitors are characterized by high residue, such residue is difficult to decompose, and can accumulate in plants and tubers posing potential harm to humans. Infrastructure construction to control the sprouting under physical conditions are expensive, and present an issue for farmers.

A plurality of plant-derived active substances have sprout inhibition activity. Sprout inhibitors developed from plant-derived active substances are characterized by strong target pertinence, high success rate of development, and biosafety for non-target organisms such as human, animals and natural enemies. Thus, plant-derived sprout inhibitors have been active research subjects. Dihydrocarvyl acetate (CAS 20777-49-5) has now been widely used in blending essences of spearmint, rose and mint and in the daily chemical industries of toothpaste, cosmetics, cleanser essence, and toilet soap. However, dihydrocarvyl acetate or isomers thereof have not been used for sprout inhibition.

SUMMARY

In view of the shortcomings in the prior art, an objective of the present disclosure is to provide a sprout inhibitor with dihydrocarvyl acetate or isomers thereof as a main active ingredient. The sprout inhibitor provided by the present disclosure has long-lasting efficacy and is safer for crops. The dihydrocarvyl acetate or isomers thereof can be used as an active substance for developing botanical pesticides, particularly used as a sprout inhibitor of tobacco, potato and other crops.

To achieve the above objective, the present disclosure provides the following technical solutions:

A natural product sprout inhibitor, comprising a main active ingredient, the main active ingredient is dihydrocarvyl acetate or isomers thereof.

Further, the natural product sprout inhibitor with the dihydrocarvyl acetate or isomers thereof as the active ingredient provided by the present disclosure is used for sprout inhibition of potato, tobacco, sweet potato, onion, garlic, and ginger.

Further, the natural product sprout inhibitor provided by the present disclosure is formulated into dosage forms for agricultural use.

Further, the dosage form of the natural product sprout inhibitor provided by the present disclosure is selected from the group consisting of an emulsifiable concentrate, an emulsion in water, a microemulsion, a soluble concentrate, and a hot fogging concentrate.

Further, adjuvants used in the natural product sprout inhibitor provided by the present disclosure may include an emulsifier, a dispersant, a wetting agent, a stabilizer, an antifreeze, a thickener, or other substances promoting the stabilization of the active ingredient in a formulation and the increasing efficacy. These adjuvants are various components commonly used or allowed in pesticide formulations and are not particularly limited, and specific components and dosage are determined by experimentation according to formulation requirements.

Further, the natural product sprout inhibitor provided by the present disclosure, where a content of the active ingredient of the dihydrocarvyl acetate or isomers thereof is 10-60% by weight, and in some other embodiments is 10-50% by weight.

Another objective of the present disclosure is to provide a method for inhibiting sprout by a natural product sprout inhibitor, where crops are treated with the natural product sprout inhibitor, and the crops include but are not limited to tobacco or potato.

Further, if tubers of potatoes and sweet potatoes are treated with the natural product sprout inhibitor provided by the present disclosure, the natural product sprout inhibitor may be formulated into a hot fogging concentrate; if the tubers of potatoes are treated with the dosage form, for example the potatoes is directly fumigated with the hot fogging concentrate after piled storage and warehousing; specific dosage may be determined according to storage conditions, while application time or frequency of application may be determined according to actual requirements.

Further, the method for inhibiting sprout by a natural product sprout inhibitor provided by the present disclosure, where the natural product sprout inhibitor may be diluted to a certain concentration before use.

Further, the dosage of the natural product sprout inhibitor provided by the present disclosure may vary with crop varieties and application methods. In the treatment of axillary buds of tobacco, the natural product sprout inhibitor may be applied in the form of cup-drenching or smearing, and during the cup-drenching or the smearing, a liquor is poured down from different angles; the axillary buds include axillary buds around topped wounds.

Further, the natural product sprout inhibitor provided by the present disclosure may be used in combination with plant protective active ingredients in addition to the dihydrocarvyl acetate, including but not limited to other sprout inhibitors, insecticides, fungicides, plant growth regulators, and fertilizers.

Compared with the prior art, the natural product sprout inhibitor provided by the present disclosure has the following beneficial effects:

The main active ingredient of the sprout inhibitor provided by the present disclosure is dihydrocarvyl acetate or isomers thereof, which have now been widely used in foods, cosmetic products and other daily chemical industries, with high safety for crops and human and without environmental pollution.

2. In the present disclosure, the natural product sprout inhibitor containing dihydrocarvyl acetate or isomers thereof features low dosage, low residue performance, and long effective duration, and no phytotoxicity.
3. The natural product sprout inhibitor provided by the present disclosure can replace artificial debudding during tobacco production, which is not only labor-saving, but also capable of achieving the objective of good yield and quality of tobacco.

DETAILED DESCRIPTION

In order to describe the objectives, technical solutions, and advantages of the present disclosure clearer, the present disclosure will be further described in detail below in conjunction with specific examples. It should be appreciated that the specific examples described herein are merely intended to explain the present disclosure, and are not intended to limit the present disclosure. Any modification, equivalent substitution and improvement made within the spirit and principle of the present disclosure shall be included within the claimed scope of the present disclosure.

The percentage of all formulations provided in the following examples is provided in percent of active by weight (converted into 100%). All processing technologies of formulations in compositions provided by the present disclosure are prior art, and the processing technologies can vary according to different conditions.

I. Preparation Examples

1. Example 1: 20% Dihydrocarvyl Acetate Microemulsion

Composition: 20% dihydrocarvyl acetate+7% rapid penetrant T+10% tristyrylphenol ethoxylates+deionized water to make up the balance.

The microemulsion was processed as follows: the above materials were fed into a mixing reactor to mix in a ratio of the formulation, and stirred to prepare the dihydrocarvyl acetate microemulsion.

2. Example 2: 20% Dihydrocarvyl Acetate Emulsion in Water

Composition: 20% dihydrocarvyl acetate+4% Cremophor EL+3% calcium alkylbenzene sulfonate+deionized water to make up the balance.

The emulsion in water was processed as follows: the above materials were fed into a mixing reactor to mix in a ratio of the formulation, stirred well, drawn into a shear mixing kettle, and shorn to prepare the dihydrocarvyl acetate emulsion in water.

3. Example 3: 50% Dihydrocarvyl Acetate Hot Fogging Concentrate

Composition: 50% dihydrocarvyl acetate+3.5% fatty alcohol polyoxyethylene ether+2.5% NP-10+4% attapulgite+1% octanol+rapeseed oil to make up the balance.

The hot fogging concentrate was processed as follows: the above materials were fed into a mixing reactor to mix in a ratio of the formulation, and stirred to prepare the dihydrocarvyl acetate hot fogging concentrate.

4. Comparative Example 1: 50% Carvone Hot Fogging Concentrate

Composition: 50% carvone+3.5% fatty alcohol polyoxyethylene ether+2.5% NP-10+4% attapulgite+1% octanol+rapeseed oil to make up the balance.

The hot fogging concentrate was processed as follows: the above materials were fed into a mixing reactor to mix in a ratio of the formulation, and stirred to prepare the carvone the hot fogging concentrate.

5. Comparative Example 2: 20% Carvone Emulsion in Water

Composition: 20% carvone+4% Cremophor EL+3% calcium alkylbenzene sulfonate+deionized water to make up the balance.

The emulsion in water was processed as follows: the above materials were fed into a mixing reactor to mix in a ratio of the formulation, stirred, drawn into a shear mixing kettle, and shorn to prepare the carvone emulsion in water.

II. Bioassay Example

1. Inhibitory Effects of Different Sprout Inhibitors on Axillary Buds of Tobacco Test method: Fifty percent of tobacco plants were topped when the first central flowers bloomed, and sprout inhibitors were applied within 24 h after removal of 2 cm axillary buds and above. Using the cup-drenching method, the active ingredients with application doses as amounts in Examples 1 to 2 and Comparative Example 2 were diluted with water for application; each plant was applied with 20 mL sprout inhibitors, and clean water was sprayed as a control.

The area of each plot was no less than 40 $m^2$ (1,100 plants/667 $m^2$), and four rows of tobacco plants were planted in each plot. One guard row was arranged between plots. Five points were randomly selected, and five plants were point-surveyed at each sampling point. The number of axillary buds with a bud length of more than 2 cm was surveyed 15 and 30 days after application, respectively, and the sprout inhibition effect was calculated according to the following formula.

Sprout inhibition rate (%)=(Number of control axillary buds−Number of treatment axillary buds)/Number of control axillary buds*100

The sprout inhibition effect in each treatment is shown in Table 1:

TABLE 1

Sprout inhibition effects of different sprout inhibitors on tobacco

| Test compound | Dosage of active ingredient (mL/plant) | Sprout inhibition rate 15 days after application (%) | Sprout inhibition rate 30 days after application (%) |
|---|---|---|---|
| Example 1 | 0.5 | 98.3 | 81.7 |
|  | 0.1 | 88.4 | 70.3 |
| Example 2 | 0.5 | 95.7 | 78.2 |
|  | 0.1 | 84.2 | 67.6 |
| Comparative Example 2 | 0.5 | 88.2 | 66.4 |
|  | 0.1 | 81.9 | 55.3 |

From Table 1, when the dosage of the active ingredient in dihydrocarvyl acetate formulations in Examples 1 and 2 is 0.5 ml/plant, the control effect is better than that obtained by the carvone formulations at either 15 or 30 days after application. Particularly, the sprout inhibition rate of the dihydrocarvyl acetate formulation in Example 1 is still as high as 81.7% at 30 days after application, which is significantly better than that provided in Comparative Example 2.

2. Effects of Different Sprout Inhibitors on Storage Effect of Potato

Test method: Harvested potatoes were sorted, graded, ventilated and stored in a storehouse for two weeks; after the skin was dried, the potatoes were placed in a closed space and the active ingredients with application doses as amounts in Example 3 and Comparative Example 1 were atomized in a thermal fogger to make the hot fogging concentrate adsorb on the surface of each potato fully; after treatment, the potatoes were stored under natural storage conditions (at 20-25° C.) and results were observed.

Each storage box was considered as one treatment. The potatoes weighed not less than 50 kg for each treatment. In each treatment, 30 potatoes were selected, the total number of bud eyes with a bud length of more than 2 cm and the number of sprouted bud eyes were surveyed 15 and 30 days after application, and the sprout inhibition rate was calculated according to the following formula.

Sprouting rate (%)=Number of sprouted bud eyes/Total number of surveyed bud eyes*100;

Sprout inhibition rate (%)=(Control sprouting rate−Treatment sprouting rate)/Control sprouting rate*100

TABLE 2

Sprout inhibition effects of different sprout inhibitors on potatoes

| Test Compound | Dosage of active ingredient (mL/kg) | Sprout inhibition rate 15 days after application (%) | Sprout inhibition rate 30 days after application (%) |
|---|---|---|---|
| Example 3 | 0.2 | 100 | 99.5 |
|  | 0.025 | 90.2 | 75.8 |
| Comparative Example 1 | 0.2 | 84.3 | 73.6 |
|  | 0.025 | 66.7 | 56.1 |

From Table 2, compared with the carvone hot fogging concentrate, different concentrations of the dihydrocarvyl acetate hot fogging concentrate in Example 3 have better sprout inhibitor on potatoes 15 and 30 days after inhibition.

What is claimed is:

1. A sprout inhibitor composition, the composition comprising:
50% dihydrocarvyl acetate, 3.5% fatty alcohol polyoxyethylene ether, 2.5% nonylphenol ethoxylate (10), 4% attapulgite, 1% octanol, the balance being rapeseed oil.

2. The sprout inhibitor composition according to claim 1, in a dosage form, wherein the dosage form of the sprout inhibitor composition is selected from the group consisting of an emulsifiable concentrate, an emulsion in water, a microemulsion, a soluble concentrate, and a hot fogging concentrate.

3. A method for inhibiting sprouting of tubers of potatoes and sweet potatoes by a sprout inhibitor, comprising fumigating the potatoes and sweet potatoes directly with the sprout inhibitor according to claim 1 with a hot fogging concentrate after piled storage and warehousing.

4. A method for inhibiting axillary buds of tobacco by applying a sprout inhibitor, comprising administrating the sprout inhibitor according to claim 1 by cup-drenching or smearing, and pouring the sprout inhibitor from different angles during the cup-drenching or the smearing; the axillary buds comprise axillary buds around topped wounds.

5. The method according to claim 3, wherein the sprout inhibitor is formulated into any dosage form for agricultural use.

6. The method according to claim 3, wherein the dosage form of the sprout inhibitor is any selected from the group consisting of an emulsifiable concentrate, an emulsion in water, a microemulsion, a soluble concentrate, and a hot fogging concentrate.

7. The method according to claim 4, wherein the sprout inhibitor is formulated into a dosage form for agricultural use.

8. The method according to claim 4, wherein the dosage form of the sprout inhibitor is one selected from the group consisting of an emulsifiable concentrate, an emulsion in water, a microemulsion, a soluble concentrate, and a hot fogging concentrate.

* * * * *